United States Patent [19]
Harris

[11] 3,858,174
[45] Dec. 31, 1974

[54] TIRE PRESSURE MONITORING SYSTEM
[75] Inventor: Paul Anthony Harris, Stonnall, England
[73] Assignee: The Lucas Electrical Company Limited, Birmingham, England
[22] Filed: July 26, 1973
[21] Appl. No.: 382,848

[30] Foreign Application Priority Data
Aug. 3, 1972 Great Britain.................. 36222/72

[52] U.S. Cl................................. 340/58, 200/61.22
[51] Int. Cl........................................... B60c 23/02
[58] Field of Search......... 340/58; 200/61.22, 61.25

[56] References Cited
UNITED STATES PATENTS
2,274,557  2/1942  Morgan et al. .............. 340/58 X
3,602,884  8/1971  Brumbelow..................... 340/58
3,723,966  3/1973  Mueller et al. ................. 340/58

Primary Examiner—Alvin H. Waring
Attorney, Agent, or Firm—Holman & Stern

[57] ABSTRACT

A tire pressure monitoring system has a tuned circuit rotating with the tire to be monitored. The tuned circuit incorporates a pressure-responsive switch, and energy is applied to the tuned circuit by a transmitter. A receiver detects energy in the tuned circuit, and the transmitter transmits signals over a band of frequencies including the resonant frequency of the tuned circuit.

2 Claims, 1 Drawing Figure

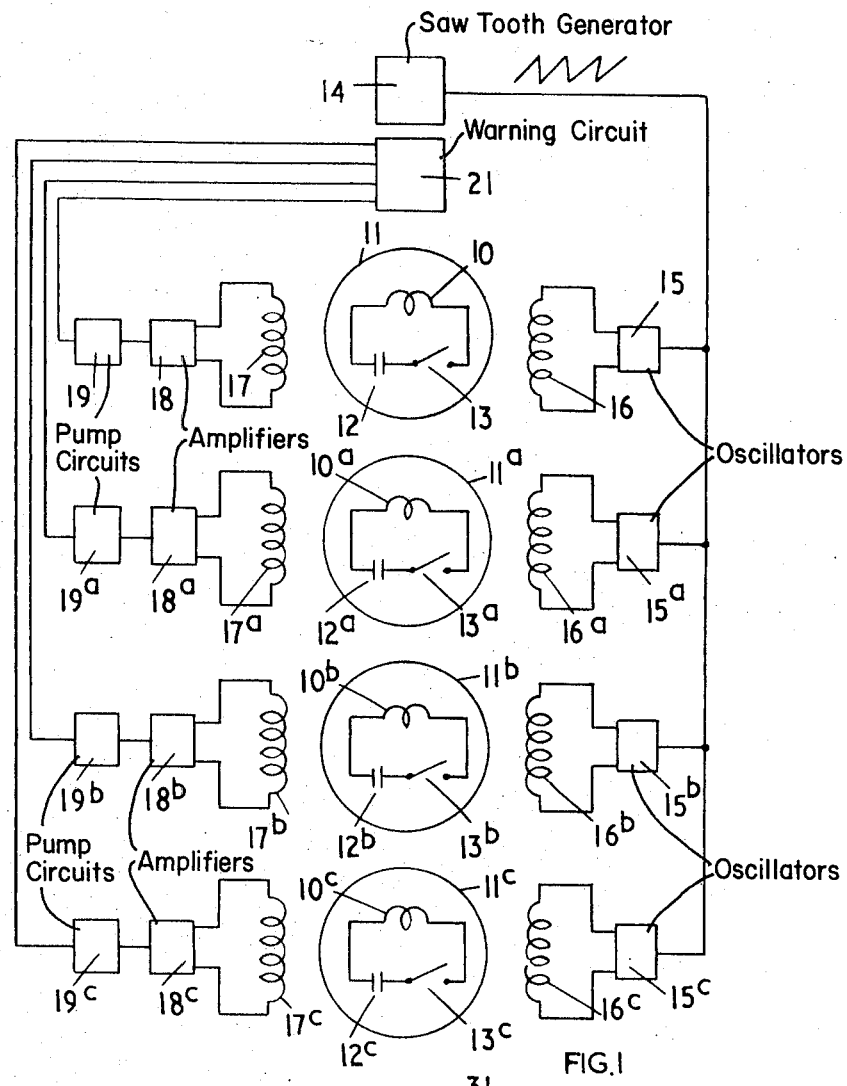
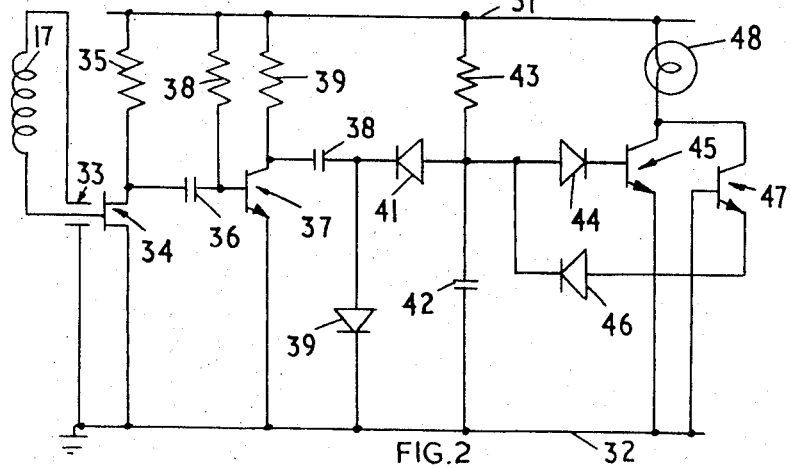

TIRE PRESSURE MONITORING SYSTEM

This invention relates to tire pressure monitoring systems, particularly for road vehicles.

A system according to the invention includes a tuned circuit rotating with the tire to be monitored, the tuned circuit including a pressure-responsive switch, a transmitter for supplying energy to the tuned circuit, and a receiver for detecting energy in the tuned circuit, said transmitter transmitting signals over a band of frequencies including the resonant frequency of the tuned circuit.

In the preferred arrangement, the system includes a controller producing a ramp voltage at a predetermined low frequency, the ramp voltage being applied to the transmitter, and the transmitter producing an output at a high frequency which is determined by the ramp voltage, so that the transmitter produces said frequency range at said predetermined low frequency. With such an arrangement, then when the pressure switch is closed, the receiver produces an output at said predetermined low frequency, and preferably the output frequency of the receiver is compared with the output frequency of the ramp voltage, and a warning is given only if the compared frequencies are unequal.

An example of the invention is illustrated in the accompanying drawings, in which FIG. 1 is a block diagram of the system, and FIG. 2 is a circuit diagram illustrating part of the block diagram shown in FIG. 1.

Referring to FIG. 1, a wheel of the vehicle is shown at 11, and has associated therewith a tuned circuit including a capacitor 12 and a switch 13, the switch being operated by the tire pressure and being closed when the tire pressure is normal, but opened when the tire pressure falls below a predetermined value.

In series with the capacitor 12 and switch 13 is a coil 10 which is concentric with and rotates with the wheel 10. The battery of the vehicle supplies power to a saw tooth generator 14 of any convenient known form, the generator 14 producing a ramp voltage which increases from zero to a maximum value, and then returns to zero, the frequency G of this voltage being relatively low, for example 500 Hz. The output from the generator 14 is fed to an oscillator 15, which is an astable multi-vibrator the frequency of which is dependent upon the input voltage it receives from the generator 14, and varies from a value A when the voltage from the generator 14 is at a minimum to a value B the voltage from the generator 14 is at a maximum. The frequencies A, B are substantially higher than the frequency G, and typically are respectively 1 and 3 MHz. It will be appreciated that the oscillator 15 will produce the frequency range A to B at a frequency G.

The output from the oscillator is fed to a transmitting aerial 16 positioned close to the wheel 11, and there is further provided a receiving aerial 17 positioned close to the wheel 11. The tuned circuit has a resonant frequency somewhere in the range A to B, and so if the switch 13 is closed, the receiving aerial 17 will detect energy in the tuned circuit at the frequency G, and will receive bursts of pulses at the frequency G. These pulses are applied to a rectifier and amplifier 18 which produces a square wave output which is fed to a pump circuit 19. The pump circuit 19 is arranged to detect the frequency G, and if the input to the circuit 19 is not at the frequency G, a warning circuit 21 coupled to the circuit 19 is operated to indicate to the driver that the tire pressure is low.

The components associated with the other wheels are indicated by the same reference numerals with the suffices $a$, $b$ and $c$ respectively. Each of the circuits 19, 19$a$, 19$b$ and 19$c$ operates a common warning means 21, as will now be explained with reference to FIG. 2.

Referring now to FIG. 2, there are provided positive and negative supply lines 31, 32 connected to the vehicle battery, the line 32 being earthed. The winding 17 has one end connected to the inner of an insulated cable 33, the other end of the winding 17 being connected to the outer of the cable 33, which is connected to the line 32. The inner is connected to the gate of a field effect transistor 34 having its drain connected to the line 32 and its source connected through a resistor 35 to the line 31 and further connected through a capacitor 36 to the base of an n-p-n transistor 37 having its base and collector connected to the line 31 through resistors 38 and 39 respectively, and its emitter connected to the line 32. The colletor of the transistor 34 is further connected to the line 32 through a capacitor 38 and a diode 39 in series, the junction of the capacitor 38 and diode 39 being connected to the line 32 through a diode 41 and a capacitor 42 in series. The junction of the capacitor 42 and diode 41 is connected through a resistor 43 to the line 31, through the anode-cathode path of a diode 44 to the base of an n-p-n transistor 45, and through the cathode-anode path of a diode 46 to the emitter of an n-p-n transistor 47. The transistor 45 has its emitter connected to the line 32, the transistor 47 has its base connected to the line 32, and the collectors of the transistors 45 and 47 are connected through a warning lamp 48 to the line 31.

The transistors 34 and 37 together with the capacitor 36 form a simple amplifier and rectifier indicated by the block 18 in FIG. 1. The transistor 37 is alternately turned on and off at a frequency dependent upon the input frequency from the receiving aerial 17, and so a square wave output is produced at the collector of the transistor 37 at the frequency G, assuming of course that the switch 13 is closed. The pump circuit shown at 19 in FIG. 1 is constituted by the capacitors 38 and 42 and their associated diodes 29 and 41, and the arrangement is such that at the frequency G, the potential at the junction of the resistor 43 and capacitor 42 is approximately earth potential, so that neither diode 44, 46 conducts. However, if the switch 13 opens, then the frequency falls to zero. A fall in frequency causes the potential at the junction of the resistor 43 and the capacitor 42 to rise, so that the diode 44 conducts and turns on the transistor 45, so illuminating the warning lamp 48. The same effect occurs if the switch 13 remains closed, but as a result of a fault in the circuit the frequency falls.

If for any reason the frequency rises, which can result from a fault in the circuit, then the potential at the junction of the resistor 43 and capacitor 42 falls below the negative line 32, and current flows from the line 32 through the base-emitter of the transistor 47 and the diode 46 to turn on the transistor 47, which illuminates the warning lamp 48. Thus, the driver is given a warning if the switch 13 opens, or if a fault in the circuit causes the frequency received by the aerial 17 to alter.

The circuits associated with the aerials 17$a$, 17$b$ and 17$c$ are the same except that the transistors 45, 47 and lamp 48 are common and constitute the warning circuit 21 shown in the block diagram. Thus, each of the four circuits has a diode equivalent to the diode 44, with the cathodes of the four diodes 44 connected to the base of the single transistor 45 to constitute an OR gate turning the transistor 45 on in the event of a fault in any one of the four separate channels. Similarly, there are four individual diodes 46 having their anodes connected to the emitter of the common transistor 47 to form another OR gate.

The circuit described has the advantage that the air gaps associated with the aerials and the wheel are not critical. Moreover, the high frequency signals which are transmitted from one aerial to the other by way of the wheel travel only a short distance, and the lower frequency signals, that is to say the frequencies at the signal G, can be transmitted to a central console incorporating the generator 14 and the warning circuit 21. Moreover, the system is fail-safe operates when the vehicle is stationary, and is not sensitive to variations in the resonant frequencies of the tuned circuits, because it is a simple manner to choose the frequency range of the oscillators 15 such that any variations in the resonant frequency still fall within the range, so that a signal is still received in the receiving aerial at the frequency G.

I claim:

1. A tire pressure monitoring system including a tuned circuit rotating with the tire to be monitored, the tuned circuit including a pressure-responsive switch, said system further including a variable frequency transmitter supplying energy to the tuned circuit, a controller producing a ramp voltage at a predetermined frequency which is low relative to the frequency range of said transmitter, means coupling said controller to said transmitter, the frequency of said transmitter being determined by said ramp voltage, whereby said transmitter transmits signals over a band of frequencies, and a receiver for detecting energy in the tuned circuit, said band of frequencies including the resonant frequency of the tuned circuit.

2. A system as claimed in claim 1 in which the output frequency of the receiver is compared with the output frequency of the ramp voltage, and a warning is given only if the compared frequencies are unequal.

* * * * *